(12) United States Patent
Welsch et al.

(10) Patent No.: US 9,612,135 B2
(45) Date of Patent: Apr. 4, 2017

(54) DEVICE FOR DETERMINING MOTION PARAMETERS

(75) Inventors: Wolfgang Welsch, Heidelberg (DE); Frank Schatz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/234,240

(22) PCT Filed: May 22, 2012

(86) PCT No.: PCT/EP2012/059459
§ 371 (c)(1),
(2), (4) Date: Jan. 22, 2014

(87) PCT Pub. No.: WO2013/013855
PCT Pub. Date: Jan. 31, 2013

(65) Prior Publication Data
US 2014/0184206 A1    Jul. 3, 2014

(30) Foreign Application Priority Data
Jul. 22, 2011   (DE) .................. 10 2011 079 631

(51) Int. Cl.
*G01N 27/72* (2006.01)
*G01N 27/80* (2006.01)
*G01D 5/20* (2006.01)

(52) U.S. Cl.
CPC .............. *G01D 5/20* (2013.01); *G01D 5/204* (2013.01)

(58) Field of Classification Search
CPC ........ G01N 27/72; G01N 27/82; G01N 27/80; G01N 27/90; G01R 33/0052; G01R 33/02;
(Continued)

(56) References Cited

U.S. PATENT DOCUMENTS 6,472,863 B1 * 10/2002 Garcia ................ G01D 5/2013
324/166
7,034,522 B2 * 4/2006 Gester ................ G01D 5/2053
324/166
(Continued)

FOREIGN PATENT DOCUMENTS

DE           42 20 801 A1    1/1994
DE    10 2007 023 385 A1   11/2008
(Continued)

OTHER PUBLICATIONS

International Search Report corresponding to PCT Application No. PCT/EP2012/059459, mailed Oct. 5, 2012 (German and English language document) (5 pages).

*Primary Examiner* — Arleen M Vazquez
*Assistant Examiner* — Taqi Nasir
(74) *Attorney, Agent, or Firm* — Maginot, Moore & Beck LLP

(57) ABSTRACT

A device for determining motion parameters includes a magnetic multipole that generates an alternating magnetic field, at least one magnetic sensor for measuring the magnetic field of the magnetic multipole, and an evaluation and control unit for evaluating the signals from the magnetic sensor. The magnetic sensor includes a magnetizable core, a drive coil, and a measuring coil. The evaluation and control unit charges the drive coil with a periodic drive signal so as to bring about a periodic magnetic reversal of the core and detects the points in time at which the magnetic reversals occur in the core. Based on the points in time at which the magnetic reversals occur, the evaluation and control unit determines a current value of the effective magnetic field of the magnetic multipole within a defined measuring range representing a range around a zero crossing of the magnetic field of the magnetic multipole.

11 Claims, 3 Drawing Sheets

(58) Field of Classification Search
CPC ...... G01R 33/07; G01R 33/093; G01R 33/04; G01R 33/091; G01R 33/098; G01R 35/005; G01R 15/205; G01R 19/0092
USPC ...... 324/331, 463, 228, 232, 207.11–207.26, 324/301, 319, 345, 381, 389, 200–206, 324/213, 219, 244–263
See application file for complete search history.

(56) References Cited

U.S. PATENT DOCUMENTS

2001/0026154 A1* 10/2001 Nekado ............... G01D 3/036
 324/207.17
2010/0090688 A1* 4/2010 Mednikov ............ G01D 5/2033
 324/207.15

FOREIGN PATENT DOCUMENTS

EP 0 191 223 A2 10/1985
TW 201033632 A1 9/2010

* cited by examiner

DEVICE FOR DETERMINING MOTION PARAMETERS

This application is a 35 U.S.C. §371 National Stage Application of PCT/EP2012/059459, filed on May 22, 2012, which claims the benefit of priority to Serial No. DE 10 2011 079 631.2, filed on Jul. 22, 2011 in Germany, the disclosures of which are incorporated herein by reference in their entirety.

BACKGROUND

The disclosure proceeds from a device for determining motion parameters.

In order to measure rotational speeds, positions or else linear motions, frequent use is made nowadays of a magnetic multipole whose magnetic field is then measured with the aid of a magnetic sensor. The multipole can be used in the form of a wheel (multipole wheel) or as a linear scale (graduated scale). Such multipoles are available in the form of adhesive tapes or on magnetized components. The magnetic field is mostly measured with the aid of Hall, AMR or GMR sensors. An approximately sinusoidal output signal is obtained therefrom. It is therefore possible to further subdivide the scale provided by the multipole, and to specify the position even in the case of intermediate values. That is helpful for an accurate measurement, but unnecessary for measuring only the rotational speed. More cost-effective concepts would be advantageous here. A further disadvantage of these concepts is that all the sensors exhibit a clear temperature influence with reference to the signal (TKE and TKO) and, moreover, can no longer be used at temperatures above 150-200° C.

A simpler and more cost-effective concept is to use a simple coil to determine the rotational speed. Said coil measures, as an induced voltage, the field changes occurring because of the in the case of rotation or linear movement. However, in this case a sufficiently fast motion of the multipole is required, since the induced voltage is a function of the speed of the field change dB/dt. This principle fails in the case of slow motions. In return, simple coils can be used even in the case of high temperatures; the signal itself is completely independent of temperature.

By way of example, a device for contactless detection of linear or rotational motions is described in Laid-open patent application DE 10 2007 023 385 A1. The device described operates with a fixed magnetoresistive chip sensor and a magnetic field transmitter device which is adjacent to said chip sensor while leaving free an air gap and whose individual magnetic segments are alternately substantially magnetized in terms of their polarity in a direction of a three-dimensional coordinate system. The chip sensor is arranged with its large surfaces substantially perpendicular or parallel, or at an arbitrary angular position therebetween, in relation to the surface of the multipole arrangement.

The older patent application DE 10 2009 001 395.4 in the name of the applicant discloses a device for measuring a magnetic field which comprises an exciter coil and a magnetizable core material. The core material has a first Weiss domain and a second Weiss domain, the first Weiss domain and the second Weiss domain adjoining a common Bloch wall. In order to measure a magnetic field, an alternating voltage is applied to the exciter coil with the formation of a periodically alternating magnetic field, the result being that the core material is periodically remagnetized. The magnetic field to be measured and the magnetic field of the exciter coil overlap one another, the result being a temporal shift in the remagnetization of the core material. The magnetic field to be measured can be deduced from the temporal shift in the remagnetization of the core material. In addition, the device has a measuring coil for measuring the change in the magnetic field of the core material, the time of the remagnetization being determined by a change in voltage induced in the measuring coil, in particular a voltage pulse.

SUMMARY

The device according to the disclosure for determining motion parameters has, by contrast, the advantage that the at least one magnetic sensor is embodied as a so-called flip core sensor with a magnetizable core, a driver coil and a measuring coil, and can be used to measure rotational speed or to measure linear motions. Embodiments of the present disclosure advantageously enable a cost-effective manufacture as well as a high sensitivity, an offset freedom and a temperature independence. Moreover, the at least one magnetic sensor of the device according to the disclosure for determining motion parameters advantageously cannot be destroyed, or be altered with reference to any parameters, by the measuring range being overshot.

The essential advantage of the use of magnetic sensors embodied as flip core sensors in the device according to the disclosure for determining motion parameters is that said sensors have the same sensitivity as AMR/GMR sensors, but are of more robust design do not exhibit temperature dependence. As soon as the values of the alternating magnetic field once again come into the measuring range of the device for determining motion parameters, the at least one magnetic sensor immediately measures correctly again and supplies correct measured values for evaluation. This means that when measuring rotational speeds with the aid of multipole wheels or else when measuring linear motions it is possible to measure a field zero crossing of the alternating magnetic field very accurately, even if the alternating magnetic field has a maximum which lies outside the measuring range of the at least one magnetic sensor. This can be achieved for known AMR/GMR sensors only given a higher outlay (costs). Hall sensors, which likewise withstand high magnetic fields, and can even measure them as well, are not so sensitive, however.

Embodiments of the present disclosure make available a device for determining motion parameters which comprises a magnetic multipole which generates an alternating magnetic field, at least one magnetic sensor for measuring the magnetic field of the magnetic multipole, and an evaluation and control unit for evaluating the signals of the at least one magnetic sensor. It is possible in this case to evaluate a relative motion between the magnetic multipole and the at least one magnetic sensor. According to the disclosure, the at least one magnetic sensor comprises a magnetizable core, a driver coil and a measuring coil, the evaluation and control unit applying a periodic driver signal to the driver coil in order to effect a periodic remagnetization of the core, and determining the remagnetization times via the measuring coil. In this case, the evaluation and control unit determines from the remagnetization times a current value of the effective magnetic field of the magnetic multipole within a prescribed measuring range which represents a range around a zero crossing of the magnetic field of the magnetic multipole. In the case of the at least one magnetic sensor, the remagnetization of the core is preferably generated as driver signal by a delta current generated in the driver coil. Since the effective magnetic field of the magnetic multipole influences the remagnetization times of the core prescribed by the periodic driver signal, the evaluation and control unit carries out a comparison of the prescribed remagnetization time of the core and the actual determined remagnetization time of the core, in order to determine the current value of the effective magnetic field of the magnetic multipole.

In order to measure a rotational speed or a linear motion, it suffices to measure the field zero crossing of the alternating magnetic field of the magnetic multipole. If, for example, the field distribution is represented as a sinusoidal distribution, the at least one magnetic sensor would always measure the magnetic field around the zero crossing. The field strength of the magnetic field in this region can be measured very accurately in this case. If the magnetic field exceeds the measurable range of values, the at least one magnetic sensor no longer conducts measurements. However, it can immediately measure again without destruction or history as soon as the magnetic field is again in the measurable range of the at least one magnetic sensor. Since the measurement always requires a period of the periodic driver signal, the measurement consists of a number of measuring points which are measured in the measuring range of the at least one magnetic sensor. Here, the number of the current values, determined in the prescribed measuring range, of the effective magnetic field of the magnetic multipole is a function of a rotational frequency and/or a speed of motion of the relative motion between the magnetic multipole and the at least one magnetic sensor, and/or of the frequency of the periodic driver signal. The frequency of the periodic driver signal is advantageously selected such that the number of the measuring points in the range of the zero crossing is large enough in order to be able to accurately determine the zero crossing of the alternating magnetic field of the magnetic multipole. To this end, the frequency of the periodic driver signal should be at least ten times, preferably at least one hundred times, greater than the maximum frequency of the alternating magnetic field of the magnetic multipole given a maximum detectable speed of the relative motion between the magnetic multipole and the at least one magnetic sensor.

The measures and developments set forth in the dependent claims enable advantageous improvements of the device for determining motion parameters as it is specified in the disclosure.

It is particularly advantageous that the core of the at least one magnetic sensor is designed as a soft magnetic thin-film core which has a magnetic layer or a plurality of magnetic layers, a separation layer being respectively arranged between two magnetic layers, in order to prevent a cross-layer crystallization between two neighboring magnetic layers. Furthermore, the driver coil and the measuring coil can be arranged on a substrate layer, the soft magnetic thin-film core being arranged within the driver coil and the measuring coil and being separated from the driver coil and the measuring coil by at least one insulating layer. This enables a very compact design of the at least one magnetic sensor.

In addition, it is possible for a plurality of magnetic sensors to be combined with or without an evaluation unit to form a sensor unit with the aid of which in addition to a rotational speed and/or speed and/or a distance covered it is also possible to determine a motion direction and/or to detect and compensate an interference field.

In an advantageous refinement of the device according to the disclosure for determining motion parameters, two magnetic sensors are arranged at a prescribed spacing in the magnetic field of the magnetic multipole. This enables the motion direction to be determined and/or an interference field to be detected and compensated as a function of the prescribed spacing of the two magnetic sensors.

In a further advantageous refinement of the device according to the disclosure for determining motion parameters, the evaluation unit determines a number of field zero crossings of the magnetic field of the magnetic multipole and calculates from the determined number of field zero crossings a rotational speed and/or speed and/or a distance covered. In order to be able to determine a motion direction there is a need for two magnetic sensors which are mounted slightly offset with respect to one another. The evaluation unit can calculate the motion direction of the relative motion between the magnetic multipole and the at least one magnetic sensor from the sequence in accordance with which the two magnetic cores are remagnetized one after another.

It is also possible in principle to detect interference fields and/or offset fields with the aid of a suitable arrangement of two magnetic sensors. If two measuring coils are respectively arranged in two neighboring zero crossings of the magnetic field of the magnetic multipole, the remagnetization of the two measurement sensors would then take place simultaneously without an interference field and/or offset field. Upon the occurrence of an interference field and/or offset field, the remagnetization time is shifted by the magnetic field of the multipole that is required to compensate the interference field and/or offset field. The actual zero-crossing moment then lies exactly between the two remagnetization pulses of the two measurement sensors.

In an advantageous refinement of the device according to the disclosure for determining motion parameters, a prescribed second spacing between the two magnetic sensors corresponds to a spacing between two neighboring zero crossings of the magnetic field of the magnetic multipole. The evaluation unit advantageously detects a magnetic interference field and/or offset field if the remagnetization of the two measurement sensors arranged at the prescribed second spacing from one another takes place at different times. The evaluation unit determines a real zero-crossing moment as the mean value between the two different times of the remagnetization of the two measurement sensors and thereby advantageously compensates the detected magnetic interference field and/or offset field.

BRIEF DESCRIPTION OF THE DRAWINGS

Exemplary embodiments of the disclosure are illustrated in the drawings, and explained in more detail in the following description. In the drawings, identical reference symbols denote components and/or elements which execute identical and/or analogous functions.

DETAILED DESCRIPTION

Figure 1:
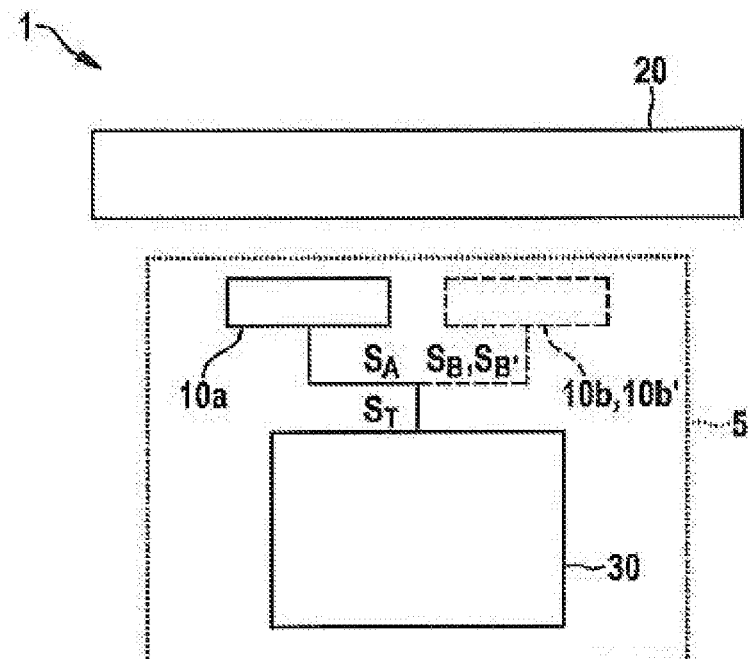
FIG. 1 shows a schematic block diagram of an exemplary embodiment of a device according to the disclosure for determining motion parameters.
Figure 2:
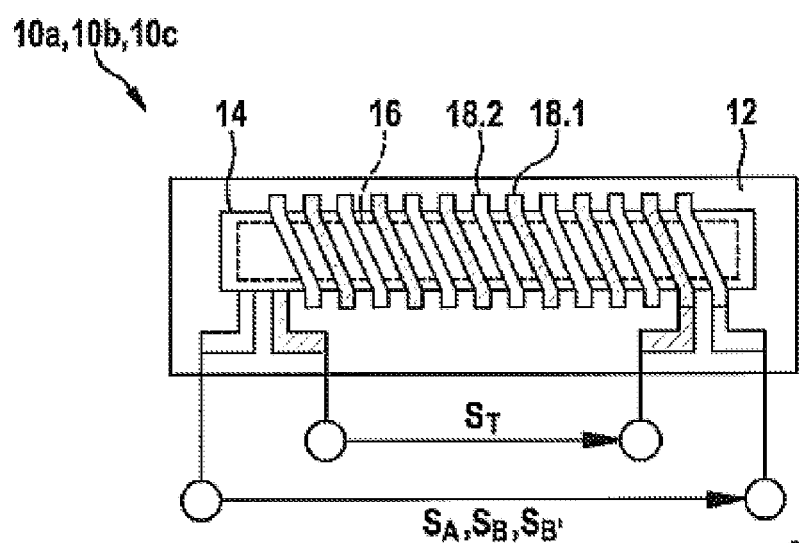
FIG. 2 shows a schematic illustration of an exemplary embodiment of magnetic sensor according to the disclosure for measuring a magnetic field of a magnetic multipole for the device for determining motion parameters from FIG. 1.
Figure 3:
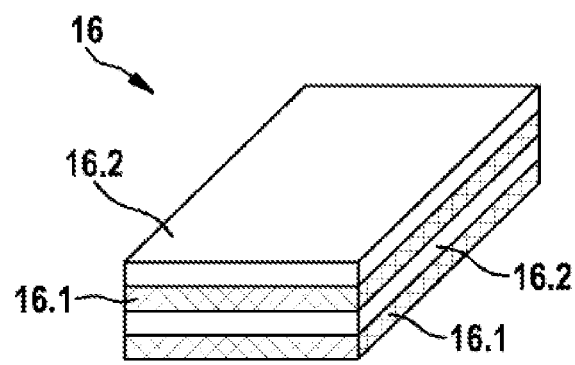
FIG. 3 shows a schematic perspective illustration of an exemplary embodiment of a magnetic core for the magnetic sensor according to the disclosure for measuring a magnetic field of a magnetic multipole from FIG. 2.

As may be seen from FIGS. 1 to 3, the illustrated exemplary embodiment of a device 1 according to the disclosure for determining motion parameters comprises a magnetic multipole 20, which generates an alternating magnetic field, at least one magnetic sensor 10a, 10b, 10b' for measuring the magnetic field of the magnetic multipole 20, and an evaluation unit 30 for evaluating the signals $S_A$, $S_B$, $S_{B'}$ of the at least one magnetic sensor 10a, 10b, 10b', it being possible to evaluate a relative motion between the magnetic multipole 20 and the at least one magnetic sensor 10a, 10b, 10b'. As may further be seen from FIG. 1, the device 1 for determining motion parameters can comprise only one magnetic field sensor 10a arranged in the alternating magnetic field of the multipole 20, if the aim is only to determine a current rotational speed and/or speed and/or a currently covered distance. If, in addition, the aim is to determine the motion direction or to detect and compensate an interference field, there is then a need for at least one further magnetic field sensor 10b, 10b', which is illustrated by dashes and is arranged in the alternating magnetic field of the multipole 20. The multipole 20 can, for example, be used in the form of a wheel (multipole wheel) or as a linear scale (graduated scale), and comprises individual magnetic segments which alternate in their magnetic polarity. In addition, it is possible for a plurality of magnetic sensors 10a, 10b, 10b' to be combined with or without an evaluation and control unit 30 to form a sensor unit 5 with the aid of which in addition to a rotational speed and/or speed and/or a distance covered it is also possible to determine a motion direction and/or to detect and compensate an interference field.

According to the disclosure, the at least one magnetic sensor 10a, 10b, 10b' comprises a magnetizable core 16, a driver coil 18.1 and a measuring coil 18.2, the evaluation and control unit 30 applying a periodic driver signal $S_T$ to the driver coil 18.1 in order to effect a periodic remagnetization of the core 16, and determining the remagnetization times of the core 16 via the measuring coil 18.2. The evaluation and control unit 30 uses the remagnetization times to determine a current value of the effective magnetic field of the magnetic multipole 20 within a prescribed measuring range which represents a range around a zero crossing of the magnetic field of the magnetic multipole 20. Since the effective magnetic field of the magnetic multipole 20 influences the remagnetization times of the core 16 as prescribed by the periodic driver signal $S_T$, the evaluation and control unit 30 compares the prescribed remagnetization time of the core 16 with the actual determined remagnetization time of the core 16, and determines by means of this comparison the current value of the effective magnetic field of the magnetic multipole 20.

As may be seen from FIGS. 2 and 3, the core 16 is designed as a soft magnetic thin-film core which is remagnetized by the periodic driver signal $S_T$ via the driver coil 18.1 at prescribed times. As may further be seen from FIG. 2, the driver coil 18.1 and the measuring coil 18.2 are preferably arranged on a substrate layer 12 made from silicon, and the soft magnetic thin-film core 16 is arranged within the driver coil 18.1 and the measuring coil 18.2 and separated by at least one insulating layer 14 from the driver coil 18.1 and the measuring coil 18.2. As may further be seen from FIG. 3, in the exemplary embodiment illustrated the soft magnetic thin-film core has a plurality of magnetic layers 16.1, a separation layer 16.2 being respectively arranged between two magnetic layers 16.1 in order to prevent a cross-layer crystallization between two neighboring magnetic layers 16.1. In the case of an alternative embodiment (not illustrated), the thin-film core 16 comprises only one magnetic layer 16.1, and so it is possible to dispense with the separation layer 16.2.

Figure 4:
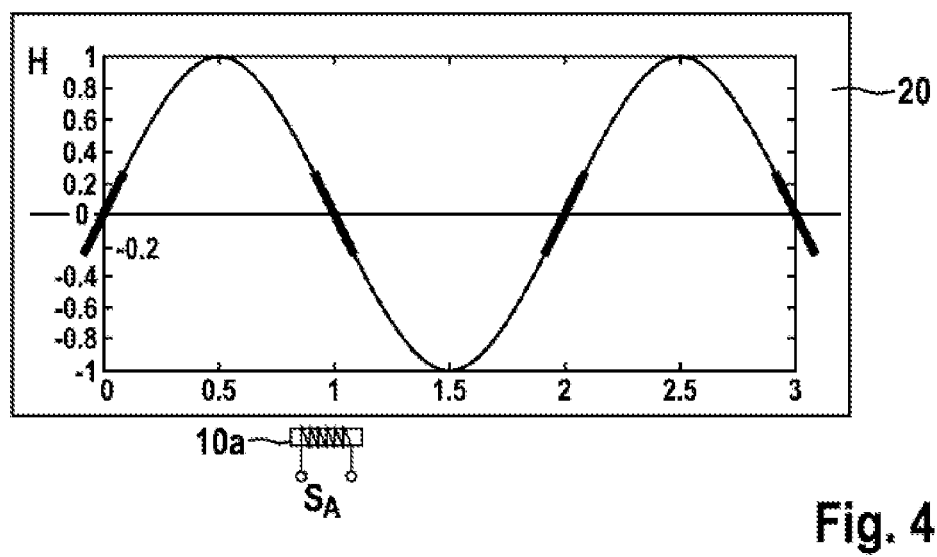
FIG. 4 shows a schematic illustration of a first exemplary embodiment of a device for determining motion parameters.
Figure 5:
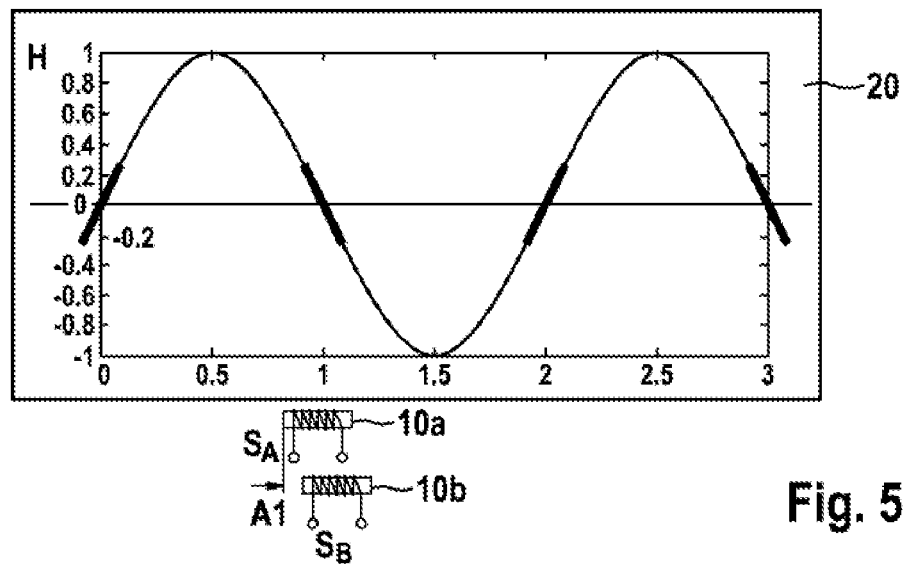
FIG. 5 shows a schematic illustration of a second exemplary embodiment of a device for determining motion parameters.
Figure 6:
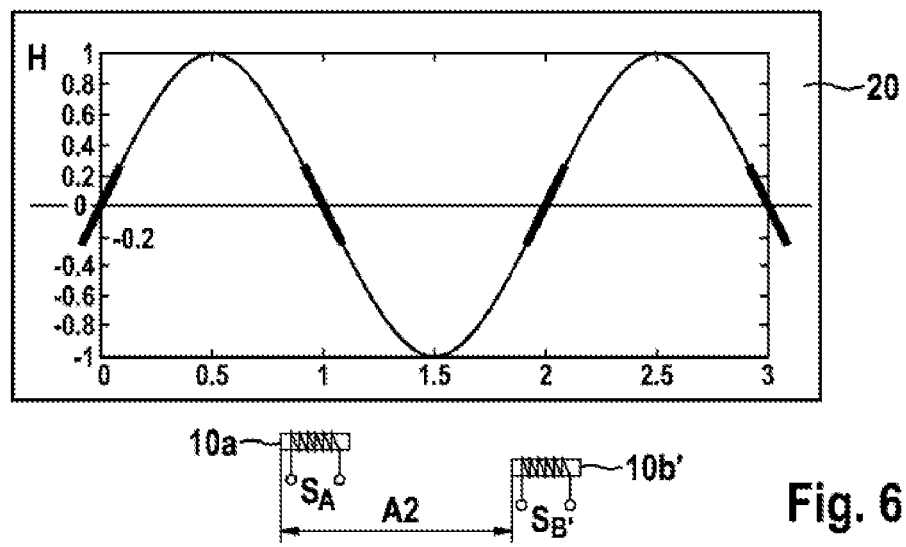
FIG. 6 shows a schematic illustration of a third exemplary embodiment of a device for determining motion parameters.

In order to measure a rotational speed or a linear motion, it suffices to measure the field zero crossing of the magnetic field of the magnetic multipole 20. If the field distribution of the magnetic field of the magnetic multipole 20 is represented as a sine, as may be seen from FIGS. 4 to 6, then the at least one magnetic sensor 10a, 10b, 10b' always measures the current values of the magnetic field of the magnetic multipole 20 in the ranges around the zero crossing which are represented in FIGS. 4 to 6 as black bars. The field strength in these ranges can be measured very accurately in this case. If the magnetic field of the magnetic multipole 20 exceeds the measurable range of values, the at least one magnetic sensor 10a, 10b, 10b' no longer conducts measurements. As soon as the values of the magnetic field of the magnetic multipole 20 reenter the measuring range of the at least one magnetic sensor 10a, 10b, 10b', said magnetic sensor again makes corresponding measured values $S_A$, $S_B$, $S_{B'}$ available for evaluation. This means that the at least one magnetic sensor 10a, 10b, 10b' is not destroyed by the strong magnetic field of the magnetic multipole 20, and also that no history is built up. Since the at least one magnetic sensor 10a, 10b, 10b' is driven by the periodic driver signal in order to measure a field value of the magnetic field of the magnetic multipole 20, the evaluation and control unit 30 determines a number of measuring points which are measured in the measuring range of the at least one magnetic sensor 10a, 10b, 10b'. The number of the current values, determined in the prescribed measuring range, of the effective magnetic field of the magnetic multipole 20 is a function of a rotational frequency and/or a speed of motion of the relative motion between the magnetic multipole 20 and the at least one magnetic sensor 10a, 10b, 10b', and/or of the frequency of the periodic driver signal $S_T$. The sensor concept corresponds to an inductive principle, the induction in the measuring coil 18.2 taking place not on the basis of the external field (multipole field), but on the basis of the sudden remagnetization of the core 16 by the driver signal $S_T$, which is made available, for example, as a delta driver current $S_T$. This sudden remagnetization can be achieved by the particular geometry and the high permeability of the core 16 which is, for example, described in the older patent application DE 10 2009 001 395.4 in the name of the applicant. The frequency of the periodic driver signal $S_T$ is advantageously selected such that the number of the measuring points in the ranges of the zero crossings of the magnetic field of the magnetic multipole 20 is large enough in order to be able to accurately determine the zero crossings of the alternating magnetic field of the magnetic multipole 20. To this end, the frequency of the periodic driver signal $S_T$ should be at least ten times, preferably at least one hundred times, greater than the maximum frequency of the alternating magnetic field of the magnetic multipole 20 given a maximum detectable speed of the relative motion between the magnetic multipole 20 and the at least one magnetic sensor 10a, 10b, 10b'.

FIG. 4 shows a first exemplary embodiment of the device 1 for determining motion parameters; in this case only one magnetic sensor 10a is arranged in the alternating magnetic field of the multipole 20, which has a sinusoidal distribution.

By way of example, the multipole 20 comprises individual magnetic segments (not illustrated) which alternate in their magnetic polarity. The evaluation and control unit 30 uses the output signal $S_A$ of the magnetic sensor 10a to determine the current values of the magnetic field of the magnetic multipole 20 in the corresponding measuring range (illustrated in bold) around each field zero crossing. By counting the field zero crossings within a prescribed time window, the evaluation and control unit 30 can determine the rotational speed and/or the speed and/or the distance covered.

FIG. 5 shows a second exemplary embodiment of the device 1 for determining motion parameters; in this case two magnetic sensors 10a, 10b are arranged in the alternating magnetic field of the multipole 20. Here, as well, the magnetic field of the magnetic multipole 20 has a sinusoidal distribution, and the multipole 20 comprises individual magnetic segments (not illustrated) which alternate in their magnetic polarity. As may further be seen from FIG. 5, the two magnetic sensors 10a, 10b are arranged at a prescribed first spacing A1 from one another in the magnetic field of the magnetic multipole 20. This means that the two magnetic sensors 10a, 10b are arranged slightly offset with respect to one another in the second exemplary embodiment illustrated. The two magnetic sensors 10a, 10b detect a field zero crossing at different times, the evaluation and control unit 30 using the sequence in accordance with which the two measuring coils 10a, 10b, arranged at a prescribed first spacing A1 from one another, are remagnetized, that is to say detect the associated field zero crossing, to calculate a motion direction of the relative motion between the magnetic multipole 20 and the at least one magnetic sensor 10a, 10b. The evaluation and control unit 30 can determine the rotational speed and/or the speed and/or the distance covered by counting the zero crossings within a prescribed time window.

FIG. 6 shows a third exemplary embodiment of the device 1 for determining motion parameters, and in this case two magnetic sensors 10a, 10b' are arranged in the alternating magnetic field of the multipole 20. Here, as well, the magnetic field of the magnetic multipole 20 has a sinusoidal distribution, and the multipole 20 comprises individual magnetic segments (not illustrated) which alternate in their magnetic polarity. As may further be seen from FIG. 6, the two magnetic sensors 10a, 10b' are arranged in the magnetic field of the magnetic multipole 20 with a prescribed second spacing A2 from one another. This means that in the third exemplary embodiment illustrated the two magnetic sensors 10a, 10b' have a spacing from one another which corresponds to a spacing between two neighboring zero crossings of the magnetic field of the magnetic multipole 20. It is possible thereby also to detect and compensate interference fields and/or offset fields. If there is no interference field or offset field, the remagnetization of the two magnetic sensors 10a, 10b' takes place simultaneously. Upon the occurrence of an interference field and/or offset field, the remagnetization times of the two magnetic sensors 10a, 10b' are shifted by the field of the multipole 20 which is required to compensate the interference field and/or offset field. By counting the zero crossings within a prescribed time window, the evaluation and control unit 30 can determine the rotational speed and/or the speed and/or the distance covered. In addition, the evaluation and control unit 30 can detect whether an interference field or offset field is active or not from a shift of the determined zero crossings. If the remagnetization of the two measuring coils 10a, 10b' arranged at the prescribed second spacing A2 from one another takes place at different times, the evaluation and control unit 30 detects an interference field or offset field. The evaluation and control unit 30 then determines a real zero-crossing moment as the mean value between the two different times of the remagnetization of the two measuring coils 10a, 10b' and thereby compensates the detected magnetic interference field.

Embodiments of the present disclosure have made available a device for determining motion parameters, in particular for measuring rotational speed or measuring linear motions, which can advantageously be produced the cost-effectively and has a high sensitivity, an offset freedom and a temperature independence. Moreover, embodiments of the present disclosure cannot be destroyed, or be altered with reference to any parameters, by the measuring range being overshot.

The invention claimed is:

1. A device for determining motion parameters, comprising:
   a magnetic multipole configured to generate a magnetic field with an alternating magnetic polarity;
   at least one magnetic sensor configured to measure the magnetic field of the magnetic multipole, the at least one magnetic sensor defining a measuring range about a zero crossing of the magnetic field; and
   an evaluation and control unit configured to evaluate output signals of the at least one magnetic sensor so as to enable the device to evaluate a relative motion between the magnetic multipole and the at least one magnetic sensor,
   wherein each of the at least one magnetic sensor respectively comprises a magnetizable core, a driver coil, and a measuring coil,
   wherein the evaluation and control unit is configured to (i) apply a periodic driver signal directly to the driver coil in order to effect periodic reversals of a magnetic polarity of the core, the periodic reversals of the magnetic polarity corresponding to field zero crossings, and (ii) determine times at which the field zero crossings occur via the measuring coil, and
   wherein the evaluation and control unit is further configured to determine the motion parameters based on the times at which the field zero crossings occur.

2. The device as claimed in claim 1, wherein a number of the field zero crossings which occur within a prescribed time window is a function of a rotational frequency and/or a speed of motion of the relative motion between the magnetic multipole and the at least one magnetic sensor, and/or of the frequency of the periodic driver signal.

3. The device as claimed in claim 1, wherein the core is configured as a soft magnetic thin-film core that has a magnetic layer or a plurality of magnetic layers, a separation layer being respectively arranged between two magnetic layers.

4. The device as claimed in claim 3, wherein the driver coil and the measuring coil are arranged on a substrate layer, the soft magnetic thin-film core being arranged within the driver coil and the measuring coil and being separated from the driver coil and the measuring coil by at least one insulating layer.

5. The device as claimed in claim 1, wherein the at least one magnetic sensor comprises two magnetic sensors, and
   wherein the two magnetic sensors are arranged at a prescribed spacing in the magnetic field of the magnetic multipole.

6. The device as claimed in claim 2, wherein the evaluation unit is configured to determine the number of the field zero crossings which occur within the prescribed time window, and calculate from the determined number of the field zero crossings one or more of a rotational speed, speed, and a distance covered.

7. The device as claimed in claim 5, wherein the evaluation unit calculates a motion direction of the relative motion between the magnetic multipole and the two magnetic sensors from a sequence in accordance with which the respective zero crossing moments of the two magnetic sensors occur.

8. The device as claimed in claim 5, wherein a prescribed second spacing between the two magnetic sensors corresponds to a spacing between two neighboring field zero crossings of the magnetic field of the magnetic multipole.

9. The device as claimed in claim 8, wherein the evaluation unit detects a magnetic interference field if the respective field zero crossings of the two magnetic sensors arranged at the prescribed second spacing from one another takes place at different times.

10. The device as claimed in claim 9, wherein the evaluation unit determines a real zero-crossing moment as the mean value between the two different times at which the respective field zero crossings occur and compensates the detected magnetic interference field.

11. The device as claimed in claim 1, wherein the magnetic field generated by the magnetic multipole has a maximum field strength, and wherein the maximum field strength is outside the measuring range of the at least one magnetic sensor.

\* \* \* \* \*